No. 832,519. PATENTED OCT. 2, 1906.
W. W. WOOD.
VENEER HANDLING MECHANISM.
APPLICATION FILED AUG. 31, 1905.
2 SHEETS—SHEET 1.
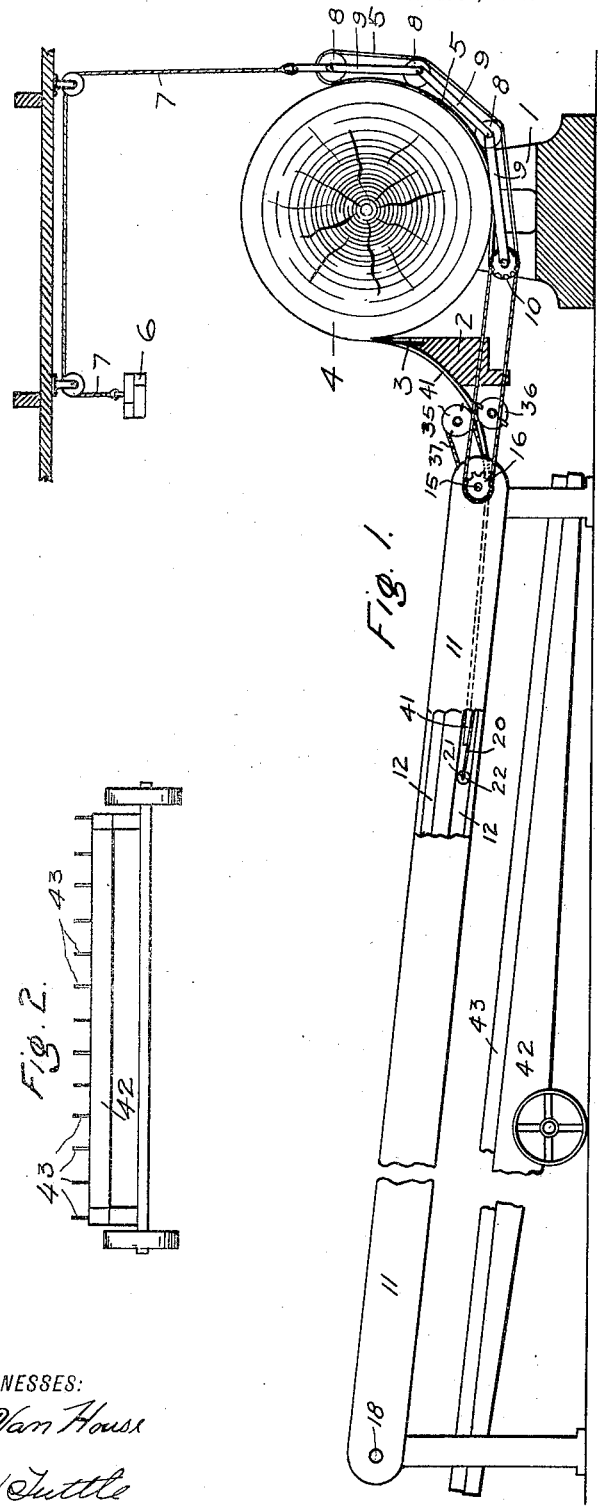
WITNESSES:
M. A. Van House
Paul V. Tuttle
INVENTOR
William W. Wood
BY
R. J. Elliott
ATTORNEY

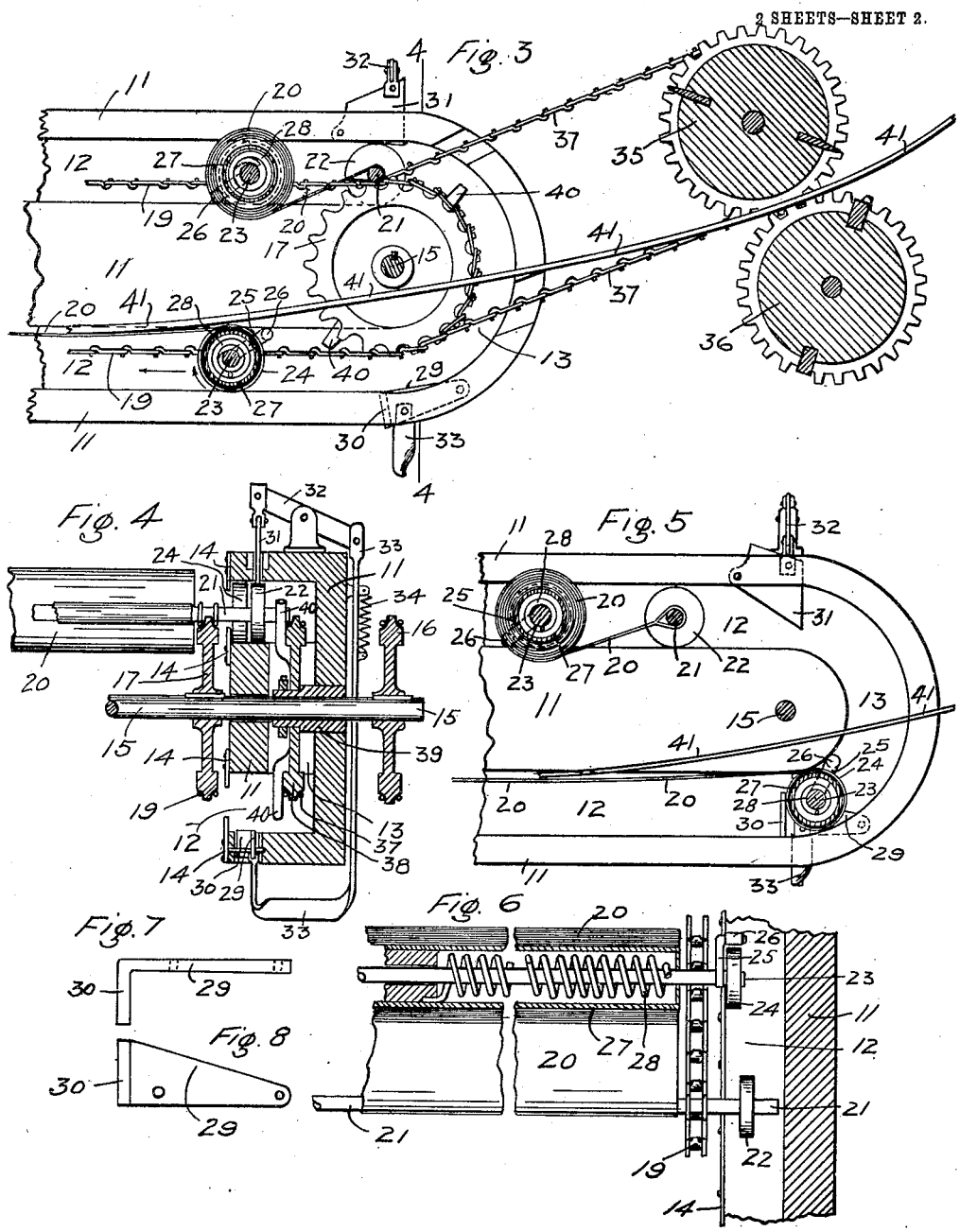

UNITED STATES PATENT OFFICE.

WILLIAM W. WOOD, OF TACOMA, WASHINGTON.

VENEER-HANDLING MECHANISM.

No. 832,519.  Specification of Letters Patent.  Patented Oct. 2, 1906.

Application filed August 31, 1905. Serial No. 276,544.

*To all whom it may concern:*

Be it known that I, WILLIAM W. WOOD, a citizen of the United States of America, residing at Tacoma, in the county of Pierce and State of Washington, have invented certain new and useful Improvements in Veneer-Handling Mechanism, of which the following is a specification, reference being had therein to the accompanying drawings.

This invention relates to conveyer-attachments to veneer-lathes, and has for its objects to support the long sheets of veneer coming from the lathe, to keep the sheets from buckling as they come from the lathe, to drop the sheets from the conveyer to the truck without injuring them, to keep the adjacent strips of a sheet from weaving together on the truck and to take entire care of the veneer from the time it leaves the knife until it is dropped in piles on the truck. I attain these objects by the devices illustrated in the accompanying drawings, in which—

Figure 1 is a side view showing a portion of a veneer-lathe and showing my conveyer and truck receiving the veneer therefrom. Fig. 2 is an end view of the truck. Fig. 3 is a section of the receiving end of the conveyer with the parts in the position which they occupy just before the veneer-sheet is cut. Fig. 4 is a cross-section of one side of the conveyer on the line 4 4 in Fig. 3. Fig. 5 is a view similar to that shown in Fig. 3 with the parts in their positions just before that shown in said Fig. 3. Fig. 6 is a partial plan and horizontal section showing the upper conveyer traveling toward the receiving end. Figs. 7 and 8 are respectively a plan and a side view of the catch located at the bottom of the receiving end of the conveyer.

Similar numerals of reference refer to similar parts throughout the several views.

This invention takes care of the veneer from the lathe to the truck and eliminates all handling thereof, thus reducing to a minimum the largest source of waste and breakage in the manufacture of veneer.

Referring to Fig. 1, the veneer-lathe is represented by the base 1, the knife-bar 2, and the knife 3. The log 4 is rotatably supported on the base 1. The conveyer-driver consists of a friction-belt 5, having one side thereof held tightly against the log 4 by means of the weight 6, supported above the machine by a rope 7, passing over a pulley and connected to the free end of the belt 5. The idle side of the belt 5 is kept separated from the working side by means of rollers 8, connected together by the links 9. The lower end roller 10 is fixed in position, but the others are loose, and the action of the weight 6 holds them closely to the log in spite of changes in diameter thereof. The roller 10 is geared by means of a sprocket-chain to the veneer-conveyer, which therefore travels at exactly the same speed as the peripheral speed of the log or as the cutting-speed of the lathe. The conveyer-frame consists of two side pieces 11, having two longitudinal recesses 12 near the top and bottom thereof, said recesses being connected at their ends by the circular recesses 13, in which the hereinafter-described sprocket-wheel turns. The recesses are preferably partially closed by metal strips 14, as shown in Figs. 4 and 6. The side pieces 11 may be supported in any convenient manner and may be secured together by braces on their upper edges, but must be entirely open between them at their inner or receiving end and lower side. The shaft 15 extends across the receiving end and is driven by sprocket chain and wheels 16 from the roller 10 of the conveyer-driver, as above described, the said sprocket-wheels 16 being outside of the side pieces 11 and being of the same diameter as the wheels connected to the roller 10. Adjacent to the side pieces 11 and on the inner sides thereof are mounted the sprocket-wheels 17 on the shaft 15. Similar wheels are mounted in corresponding position on the shaft 18 at the other end of the side frames 11. The conveyer-chains 19 pass around these wheels, which are of the same diameter as the wheels 16. The central longitudinal planes of the recesses 12 and 13 are approximately the planes of the chains 19. The conveyer consists of two sheets 20, of canvas or other suitable material, the forward ends of each being attached to the chains 19 at correspondingly opposite points, while their rear ends are mounted on spring-rollers, which may be held stationary or allowed to roll up, as hereinafter described. The bars 21, to which the forward or traveling ends of the conveyer are attached, are secured to the chains 19 and extend beyond said chains into the recess 12. The wheels 22 are loosely mounted on the bars 21, being confined from longitudinal motion thereon by any suitable means and being located a little distance from the edges of said recesses. The bars 21 extend beyond the wheels 22. The bars 23 are similar to the bars 21, but are not so long and are not secured in any way to the chains 19. They are mounted on loose wheels 24, which travel in the recesses 12 close to the edge thereof. The bars 23 are kept from rotating by means of the follower-arms 25, secured thereto, on which the small roller 26 is mounted, the length of the arms 25 being such as to prevent the rotation of the bars 23 by engaging the top or bottom of the recess. The hollow rollers 27 are rotatably mounted on the bars 23, having the spiral springs 28 secured between them and the bars in the well-known manner, one end of the spring being secured to the bar and the other end to the roller. Thus when the bar 23 is held and the forward bar 21 moves the canvas sheet 20, which is wound around the roller 27, is unwound therefrom and the spring 28 is tightened, and as soon as the bar 23 is released the canvas is rolled up again on the roller 27, which then follows the bar 21 closely, as shown in the upper portions of Figs. 3 and 5. The canvas is so wound on the roller 27 and the spring 28 is so arranged that the canvas will be unwound from the top of the roller when the bar 23 is stationary; but the roller will roll forward and under the canvas when it is released, as indicated by the arrows in Fig. 3.

The mechanism controlling the holding and releasing of the bar 23 is illustrated in Figs. 3, 4, 5, 7, and 8. At the beginning of the lower recess 12 is pivoted the holder, having its upper surface 29 inclined and being bent inward at right angles to form the block 30. The part 29 of the holder is placed in line with the wheels 22 of the front bars 21, so as to be depressed thereby when they pass, but out of line with the wheels 24 of the rear bars 23, so that said wheels 24 will be engaged and held by the blocks 30. Since the veneer-lathe turns continuously, it is evident that when one length of veneer is cut and placed on the truck the conveyer must be ready to take care of the next length. Thus it is necessary to have the double set of canvas sheets 20. Now when the veneer has almost reached the required length the conveyer-sheet 20 is rolled from thereunder, as above described, and it falls gently on the truck. This releasing of the roller-bar 23 is done when the other conveyer-sheet is about ready to take its place and is operated by means of the forward bar 21 of the other conveyer-sheet, which presses upward the inclined lever 31, pivoted to the frame 11, which connects with the block-piece 30 by means of the arm 32 and the bent link 33, located outside of the frame 11, as shown in Fig. 4. The action causes tension in the spring 34, which forces the parts to their normal positions when the wheel 22 has passed the lever 31. Now the veneer sheet is cut to the required length by means of the knife-roll 35, mounted in connection with the block-roll 36, between which the sheet of veneer passes. The rolls 35 and 36 are geared together and are operated by the sprocket-chain 37, which passes over the wheel 38, mounted loosely on the outside of the bearing-piece 39 of the shaft 15. The wheel 38 is provided with two side extensions 40, which are long enough to be engaged by the end of the bar 21 as it passes along the recesses 12 and 13. Thus as the bar 21 engages and forces one of the extensions 40 around it turns the rolls 35 and 36, so as to cut off the veneer sheet. In the drawings I have arranged the parts so that the canvas sheet 20 is withdrawn from under the veener sheet 41 just before the knife-roll 35 cuts the veneer sheet, thus allowing the veneer to fall on the truck a moment before it is cut loose from the lathe; but if it is desired to alter this time relation between the parts the block 30 may be operated from the lever 31, which may be located in some other part of the recess. Since all the sprocket-wheels and gears are of the same size and since they are operated by the peripheral motion of the log on the lathe, it is evident that all the parts engaging the veneer travel at exactly the same speed that it does, thus reducing the strains and the wear thereon In commercial practice it is customary to score the veneer before it is turned from the log by suitable scoring-wheels placed at desired distances apart, thus cutting a sheet of veneer into several strips at the same time that it is turned from the lathe. These strips are very apt to become interlaced or interwoven when the sheet is cut any considerable length, and the difficulty of handling them is thus increased. To overcome this difficulty, I divide the upper surface of the truck 42 with thin vertical partitions 43, spaced to correspond with the spacing of the scoring-wheels. This truck is placed below the conveyer and the strips of veneer fall off the conveyer into the spaces formed by the partitions 43 under them without any possibility of interweaving.

Having described my invention, what I claim is—

1. In a veneer-handling mechanism, the combination with a veneer-lathe having a log rotated therein, a roller mounted on said veneer-lathe, a series of rollers mounted on consecutive movable links, an endless belt passing over said rollers and adapted to engage the log, an apron conveyer mounted adjacent to the veneer-lathe, and connecting means joining said conveyer with said first roller whereby said conveyer is driven at a speed equal to the peripheral speed of the log.

2. In a veneer-handling mechanism, the combination of a continuously-driven conveyer-chain, a pair of apron conveyers secured thereto at points diametrically opposite to each other, means whereby the lower of said apron conveyers is extended to form a support for the veneer, and means whereby said lower conveyer is rolled from under the veneer.

3. In a veneer-handling mechanism, the combination of a continuously-driven conveyer-chain, a pair of apron conveyers each having one end secured to said chain at points diametrically opposite to each other, rollers secured to the other ends of said apron conveyers, springs within said rollers and adapted to wind said aprons on said rollers, and means whereby the lower of said apron conveyers is unwound from the roller to form a support for the veneer.

4. In a veneer-handling mechanism, the combination of a continuously-driven conveyer-chain, a pair of apron conveyers each having one end secured to said chain at points diametrically opposite to each other, rollers secured to the other ends of said apron conveyers, supporting-rods, means for keeping the supporting-rods from rotating, springs within said rollers and connected thereto and to the supporting-rods and adapted to be tightened when the apron is unwound from the roller and to rewind the apron on the roller when the supporting-rod is released, and means whereby the supporting-rod of the lower apron conveyer is held stationary while the apron is unwound therefrom to form a support for the veneer.

5. In a veneer-handling mechanism, the combination of a continuously-driven conveyer-chain, and a pair of apron conveyers secured thereto at points diametrically opposite to each other and each adapted to act alternately to support a sheet of veneer and to drop said sheet when it has been fed on the conveyer a predetermined distance.

6. In a veneer-handling mechanism, the combination of a continuously-driven conveyer-chain, a pair of apron conveyers secured thereto at points diametrically opposite to each other and each adapted to act alternately to support a sheet of veneer, and tripping means operated by the idle apron conveyer whereby the active conveyer is released and allowed to roll from under the veneer sheet whereby the sheet is dropped when it has been fed on the conveyer a predetermined distance.

7. In a veneer-handling mechanism, the combination of a continuously-driven conveyer-chain, a pair of apron conveyers secured thereto at points diametrically opposite to each other and each adapted to act alternately to support a sheet of veneer, a block adapted to hold the free end of the active apron conveyer, and a lever connected to said block and being in the path of the idle conveyer and adapted to remove the block from holding the active conveyer when it is actuated by the idle conveyer.

8. In a veneer-handling mechanism, the combination of a continuously-driven conveyer-chain, a pair of apron conveyers se-secured at one end thereto at points diametrically opposite to each other and each adapted to act alternately to support a sheet of veneer, spring-actuated rollers secured to the free ends of said aprons and adapted to wind the aprons thereon, a block adapted to engage and hold the roller of the active apron conveyer against longitudinal motion, a lever in the path of the idle conveyer and adapted to be actuated thereby, and connecting means joining said lever to said block whereby said block is removed from the active conveyer when the idle conveyer actuates the lever and said spring-roller winds said active conveyer from under the sheet of veneer.

9. In a veneer-handling mechanism, the combination of an apron conveyer for supporting and carrying sheets of veneer, a table below said conveyer adapted to receive said sheets, and mechanism for withdrawing said apron from beneath said sheets of veneer and allowing said veneer to drop on said table.

10. In a veneer-handling mechanism, the combination of an apron conveyer for supporting and carrying parallel sheets of veneer lying side by side, a table below said conveyer, vertical partitions on said table to form compartments thereon corresponding with the sheets on the conveyer, and mechanism for withdrawing said apron conveyer from beneath said parallel sheets and allowing them to drop into the compartments on said table.

In testimony whereof I affix my signature in presence of two witnesses.

WILLIAM W. WOOD.

Witnesses:
  M. H. COREY,
  M. A. VAN HOUSE.